United States Patent
Shinfuku et al.

(10) Patent No.: US 11,007,674 B2
(45) Date of Patent: May 18, 2021

(54) METHOD FOR MANUFACTURING HEATED MOLDING MATERIAL AND DEVICE FOR HEATING MOLDING MATERIAL

(71) Applicant: Teijin Limited, Osaka (JP)

(72) Inventors: Yohei Shinfuku, Osaka (JP); Noriyuki Amano, Osaka (JP); Guofei Hua, Osaka (JP)

(73) Assignee: Teijin Limited, Osaka (JP)

( * ) Notice: Subject to any disclaimer, the term of this patent is extended or adjusted under 35 U.S.C. 154(b) by 245 days.

(21) Appl. No.: 16/065,456

(22) PCT Filed: Dec. 13, 2016

(86) PCT No.: PCT/JP2016/087115
§ 371 (c)(1),
(2) Date: Jun. 22, 2018

(87) PCT Pub. No.: WO2017/110595
PCT Pub. Date: Jun. 29, 2017

(65) Prior Publication Data
US 2019/0001530 A1    Jan. 3, 2019

(30) Foreign Application Priority Data
Dec. 25, 2015   (JP) ............................. JP2015-254638

(51) Int. Cl.
*B29C 70/06*    (2006.01)
*B29C 35/04*    (2006.01)
(Continued)

(52) U.S. Cl.
CPC ............ *B29B 13/022* (2013.01); *B29B 13/02* (2013.01); *B29C 33/048* (2013.01);
(Continued)

(58) Field of Classification Search
CPC ... B29C 35/049; B29C 35/06; B29C 35/0288; B29C 35/045; B29C 33/048; B29C 70/06; B29C 70/12
See application file for complete search history.

(56) References Cited

U.S. PATENT DOCUMENTS 5,283,026 A * 2/1994 Okumura ................ B29B 13/02
                                                             264/234
2010/0068518 A1   3/2010 Honma et al.
(Continued)

FOREIGN PATENT DOCUMENTS

FR       2872731 A1   1/2006
GB       1286125 A    8/1972
(Continued)

OTHER PUBLICATIONS

Jan. 4, 2019—(EP)—Supplementary Search Report—App 16878486.6.
Jan. 18, 2019—(EP) Office Action—App 16878486.6.
Jan. 31, 2017—(PCT/JP) Written Opinion of the International Searching Authority—App 2016/087115—Eng Tran.
Jan. 31, 2017—International Search Report—Intl App PCT/JP2016/087115.

*Primary Examiner* — Joseph S Del Sole
*Assistant Examiner* — Mohamed K Ahmed Ali
(74) *Attorney, Agent, or Firm* — Banner & Witcoff, Ltd.

(57) ABSTRACT

The present invention provides a heating device and a method for manufacturing a heated molding material. The method uses the heating device to continuously manufacture the heated molding material. The heating device includes a heating chamber for heating a molding material, at least one opening section for feeding or expelling molding material therethrough, and a means for using nitrogen gas or superheated steam to expel oxygen gas present in the heating chamber.

8 Claims, 3 Drawing Sheets

(51) Int. Cl.
  *B29C 33/04* (2006.01)
  *B29C 43/56* (2006.01)
  *B29C 70/12* (2006.01)
  *B29C 35/06* (2006.01)
  *B29C 35/02* (2006.01)
  *B29C 43/58* (2006.01)
  *B29B 13/02* (2006.01)

(52) U.S. Cl.
  CPC .......... *B29C 35/045* (2013.01); *B29C 35/049* (2013.01); *B29C 43/56* (2013.01); *B29C 70/06* (2013.01); *B29C 70/12* (2013.01); *B29C 35/0288* (2013.01); *B29C 35/06* (2013.01); *B29C 2035/048* (2013.01); *B29C 2043/5816* (2013.01)

(56) References Cited

U.S. PATENT DOCUMENTS

| | | |
|---|---|---|
| 2010/0092687 A1 | 4/2010 | Sumida et al. |
| 2012/0133067 A1 | 5/2012 | Ashida |
| 2018/0361632 A1* | 12/2018 | Yokomizo ............... B29C 43/34 |

FOREIGN PATENT DOCUMENTS

| | | |
|---|---|---|
| JP | H05-245866 A | 9/1993 |
| JP | 2008-202178 A | 9/2008 |
| JP | 2012-153133 A | 8/2012 |
| JP | 2013-049150 A | 3/2013 |
| JP | 2015-047807 A | 3/2015 |

* cited by examiner

METHOD FOR MANUFACTURING HEATED MOLDING MATERIAL AND DEVICE FOR HEATING MOLDING MATERIAL

CROSS REFERENCE TO RELATED APPLICATIONS

This is a U.S. National Phase Application under 35 U.S.C. § 371 of International Application No. PCT/JP2016/087115, filed Dec. 13, 2016, which claims priority to Japanese Application No. 2015-254638, filed Dec. 25, 2015, the entire contents of each of which are incorporated herein by reference.

TECHNICAL FIELD

The present invention relates to a method for producing a heated molding material using a heating device provided with a means of expelling oxygen gas existing in a heating chamber using a nitrogen gas or a superheated steam, and to a heating device for a molding material.

BACKGROUND ART

Recently, in the field of machinery, attention has been paid to so-called fiber reinforced molding materials containing reinforcing fibers such as carbon fibers or the like. In such molding materials, fibers are dispersed in the matrix resin, and therefore the materials are excellent in tensile modulus, tensile strength and impact resistance and are now investigated for use for structural members for automobiles, etc. These molding materials can be molded into intended shapes through injection molding, compression molding, etc.

Here, in the case of compression molding of molding materials, the molding materials must be previously heated. In this connection, PTL 1 describes various methods for heating molding materials. PTL 2 describes a method of producing a composite material using superheated steam.

CITATION LIST

Patent Literature

PTL 1: JP-A-2013-49150
PTL 2: JP-A-2015-47807

SUMMARY OF INVENTION

Technical Problem

However, the method described in PTL 1 could not solve the problem of continuously producing a molding material, and does not investigate in detail a means for expelling an oxygen gas, and is therefore insufficient as shaped products especially in the evaluation viewpoint of improving the appearance of shaped products after weathering test. The method described in PTL 2 is for equipment for impregnating a thermoplastic resin in carbon fibers and is not a technique for heating a molding material for compression molding thereof.

Accordingly, an object of the present invention is to provide a method for continuously producing a heated molding material by heating a molding material, and to provide a heating device capable of continuously heating a molding material.

Solution to Problem

For solving the above-mentioned problem, the present invention provides the following means.

1. A method for producing a heated molding material, the method including using a heating device to continuously produce a heated molding material,
wherein the heating device includes:
a heating chamber for heating a molding material;
at least one opening section for supplying or discharging a molding material therethrough; and
a means for expelling the oxygen gas existing in the heating chamber using a nitrogen gas or a superheated steam.
2. The method for producing a heated molding material according to the above 1, wherein the heated molding material is a molding material for compression molding that contains carbon fibers having a fiber length of 1 to 100 mm and a thermoplastic resin.
3. The method for producing a heated molding material according to any of the above 1 or 2, wherein the heating device includes:
a circulation mechanism of circulating and heating a gas in the heating chamber; and
a mechanism of jetting a gas containing at least one of a nitrogen gas, a superheated steam or a saturated water vapor in the same direction as a circulating direction of the gas in the heating chamber.
4. The method for producing a heated molding material according to any one of the above 1 to 3, wherein the heating device is provided with the means for expelling the oxygen gas existing in the heating chamber using a superheated steam, and wherein the heating device includes a mechanism for introducing a saturated water vapor into the heating device under a pressure higher than the atmospheric pressure.
5. The method for producing a heated molding material according to any one of the above 1 to 4, wherein the opening section is openable and closable and the opening time is 1 second or more and 10 seconds or less per one opening thereof.
6. The method for producing a heated molding material according to any one of the above 1 to 5, wherein the oxygen gas concentration in the heating chamber is 10 vol % or less.
7. The method for producing a heated molding material according to any one of the above 1 to 6, wherein:
the molding material contains carbon fibers and a thermoplastic resin, and is compression-molded into a shaped product after heated, and wherein:
the relationship between the number-average molecular weight Mn1 and the weight-average molecular weight Mw1 of the thermoplastic resin existing in the surface layer region of the resultant shaped product, and
the number-average molecular weight Mn2 and the weight-average molecular weight Mw2 of the thermoplastic resin existing in the central region of the shaped product satisfy the following relation:

$$1.0 < (Mw1/Mn1)/(Mw2/Mn2) < 2.6,$$

wherein the surface layer region is a region within less than 50 μm from the surface of the shaped product, and the central region is a region other than the surface layer region of the shaped product.
8. The method for producing a heated molding material according to any one of the above 1 to 7, wherein:
the temperature of the heated molding material is a temperature higher than the melting point of a crystalline resin by 30° C. or more when the thermoplastic resin in the heated molding material is the crystalline resin, or a temperature higher than the glass transition temperature of an amorphous resin by 100° C. or more when the resin is the amorphous resin.

9. The method for producing a heated molding material according to any one of the above 1 to 8, wherein the thickness of the molding material before heating is 0.5 mm or more.

10. A heating device for continuously heating a molding material, the heating device including:
   a heating chamber for heating a molding material;
   at least one opening section for supplying or discharging a molding material; and
   a means for expelling an oxygen gas existing in the heating chamber, using a nitrogen gas or a superheated steam.

11. The heating device according to the above 10, wherein the heated molding material is a molding material for compression molding, containing carbon fibers having a fiber length of 1 to 100 mm and a thermoplastic resin.

12. The heating device for a molding material according to any of the above 10 or 11, further including:
   a circulation mechanism for circulating and heating a gas in the heating chamber; and
   a mechanism of jetting a gas containing at least one of a nitrogen gas, a superheated steam or a saturated water vapor in the same direction as a circulating direction of the gas in the heating chamber.

13. The heating device according to any one of the above 10 to 12, wherein the heating device is provided with the means for expelling the oxygen gas existing in the heating chamber using a superheated steam, and wherein the heating device includes a mechanism for introducing a saturated water vapor into the heating device under a pressure higher than the atmospheric pressure.

14. The heating device for a molding material according to any one of the above 10 to 13, wherein the opening section is openable and closable and the opening time is 1 second or more and 10 seconds or less per one opening thereof.

15. The heating device for a molding material according to any one of the above 10 to 14, wherein the oxygen gas concentration in the heating chamber is 10 vol % or less.

16. The method heating device for a molding material according to any one of the above 10 to 15, wherein:
   the molding material contains carbon fibers and a thermoplastic resin, and is, after heated, compression-molded into a shaped product, and wherein:
   the relationship between the number-average molecular weight Mn1 and the weight-average molecular weight Mw1 of the thermoplastic resin existing in the surface layer region of the resultant shaped product, and
   the number-average molecular weight Mn2 and the weight-average molecular weight Mw2 of the thermoplastic resin existing in the central region of the shaped product satisfy the following relation:

$1.0<(Mw1/Mn1)/(Mw2/Mn2)<2.6$, wherein the surface layer region is a region within less than 50 wn from the surface of the shaped product, and the central region is a region other than the surface layer region of the shaped product.

17. The heating device for a molding material according to any one of the above 10 to 16, wherein:
   the heating temperature of the molding material is a temperature higher than the melting point of a crystalline resin by 30° C. or more when the thermoplastic resin in the heated molding material is the crystalline resin, or a temperature higher than the glass transition temperature of an amorphous resin by 100° C. or more when the resin is the amorphous resin.

18. The heating device for a molding material according to any one of the above 10 to 17, wherein the thickness of the molding material before heating is 0.5 mm or more.

Advantageous Effects of Invention

The heating device of the present invention is provided with a means for expelling an oxygen gas. Accordingly, even in continuously heating a molding material, the molecular weight of the surface of the molding material hardly lowers and the shaped product obtained using the molding material has an excellent appearance even after weathering test.

DESCRIPTION OF EMBODIMENTS (Heating Device)

The heating device for a molding material of the present invention is a device for continuously heating a molding material, and the heating device includes a heating chamber for heating a molding material; at least one opening section for supplying or discharging a molding material; and a means for expelling an oxygen gas existing in the heating chamber, using a nitrogen gas or a superheated steam.

Specifically, the heating device of the present invention can heat a molding material continuously but not batch-wise, and therefore, as compared with any conventional production method, the heating device can efficiently heat a molding material. The method for conveying a molding material is not specifically limited, and a belt conveyor or the like may be used for conveying a molding material.

For heating a molding material in the present invention, the oxygen gas existing in the heating chamber is expelled and a molding material is heated in a lower oxygen gas atmosphere than air, and in heating a molding material, the atmosphere is kept to have a lower oxygen gas concentration than air. The oxygen gas concentration will be described below.

(Heating Chamber)

Figure 1:
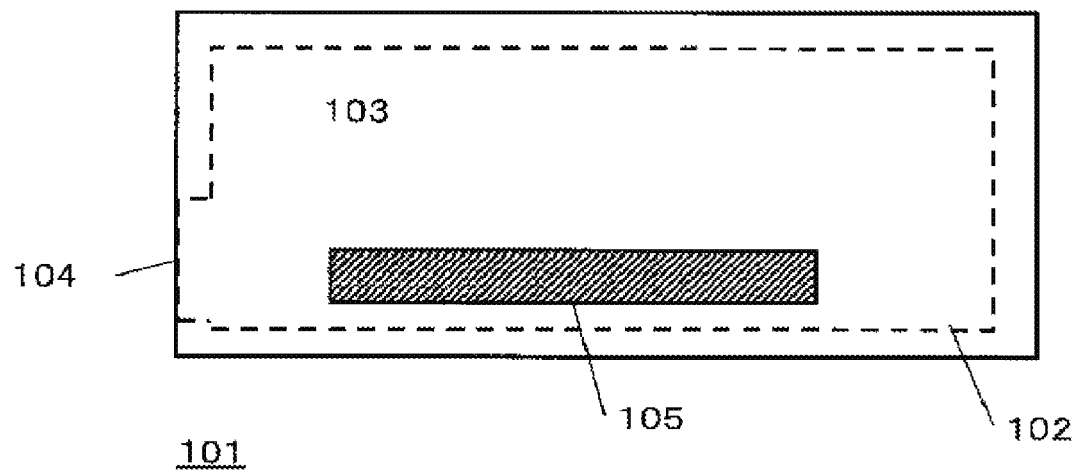
FIG. 1 is a schematic view showing one example of a heating device for a molding material.

The heating chamber for use in the present invention is, for example, the part 102 (surrounded by the dotted line) in FIG. 1, and is not specifically limited so far as it has a space capable of heating a molding material, and may be any known one. The material of the inner wall of the heating chamber is not also specifically limited, but in the case where a water vapor is introduced thereinto, the material is preferably SUS (stainless steel plate) from the viewpoint of corrosion proofing.

(Opening Section)

Figure 2:
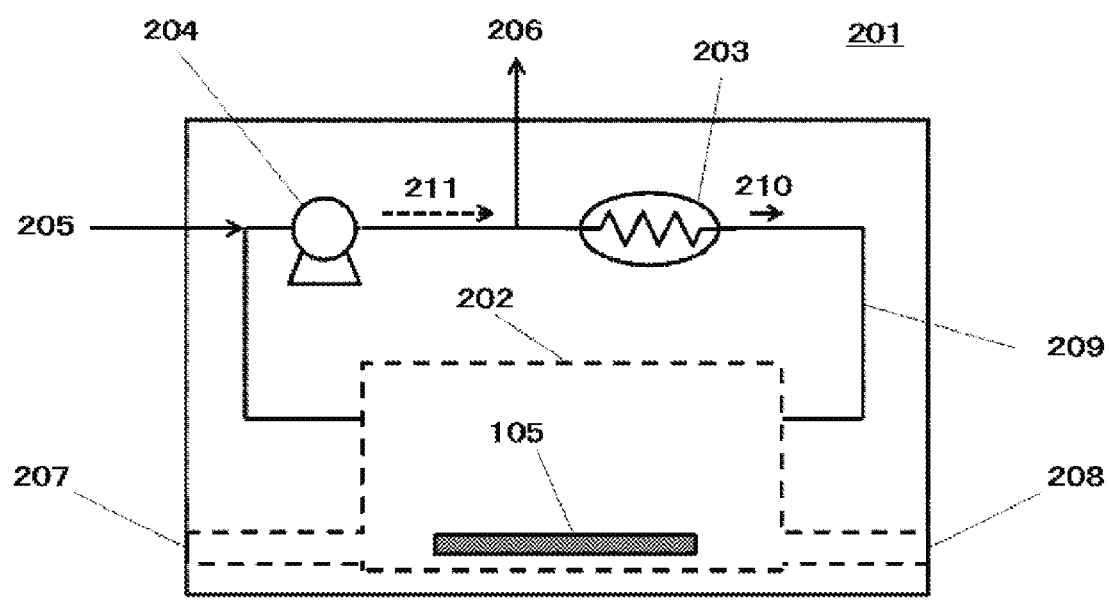
FIG. 2 is a schematic view showing one example of a heating device having a circulation mechanism.

The opening section is for supplying or discharging a molding material, and the heating device is provided with at least one opening section (for example, 104 in FIG. 1), but is preferably provided with two opening sections of a supply part and a discharge part for a molding material (for example, 207 and 208 in FIG. 2). The size and the shape of the opening section are not specifically limited so far as they are a size and a shape capable of carrying a molding material therethrough.

The supply mode and the discharge mode for a molding material through the opening section are not specifically limited, and may be a labyrinth system or an openable system, but is preferably an openable system from the viewpoint of equipment.

In the case where the opening section is an openable system that is openable and closable, there is a high possibility that external air may enter the heating chamber while the opening section is kept open, and therefore, the opening time is preferably 1 second or more and 10 seconds or less per one opening thereof, more preferably 1 second or more and 7 seconds or less, even more preferably 2 seconds or more and 5 seconds or less.

(Means for Expelling Oxygen Gas)

The means for expelling an oxygen gas in the present invention expels an oxygen gas by extruding it using a nitrogen gas or a superheated steam, and on the way, after an oxygen gas has been once drawn off (partly or entirely) by pressure control, a nitrogen gas or a superheated steam may be charged in the chamber. The oxygen gas to be expelled is air-derived one, and in expelling the oxygen gas, air is also expelled at the same time.

From the viewpoint of equipment, preferably, the oxygen gas is expelled by filling with a nitrogen gas or a superheated steam, that is, by purging with a nitrogen gas or a superheated steam. The heating device of the present invention is for continuously producing a molding material, and therefore air (containing an oxygen gas) comes therein through the opening section for supplying or discharging a molding material. Consequently, it is desirable that a nitrogen gas or a superheated steam is kept continuously introduced into the chamber until heating all the molding material is finished.

The means for expelling the oxygen gas in the present invention uses a nitrogen gas or a superheated steam, but a gas containing a nitrogen gas or a superheated steam may be used, that is, any other inert gas (for example, an argon gas) or a saturated water vapor may be used at the same time in such a degree that the object of the present invention can be attained.

Figure 4:
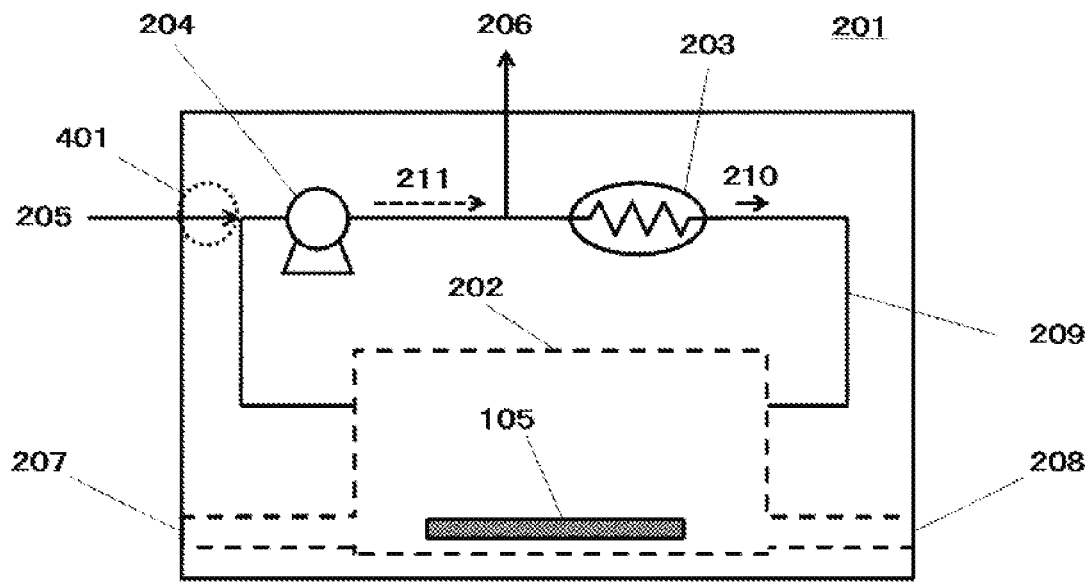
FIG. 4 is a schematic view showing one example of a heating device.
Figure 5:
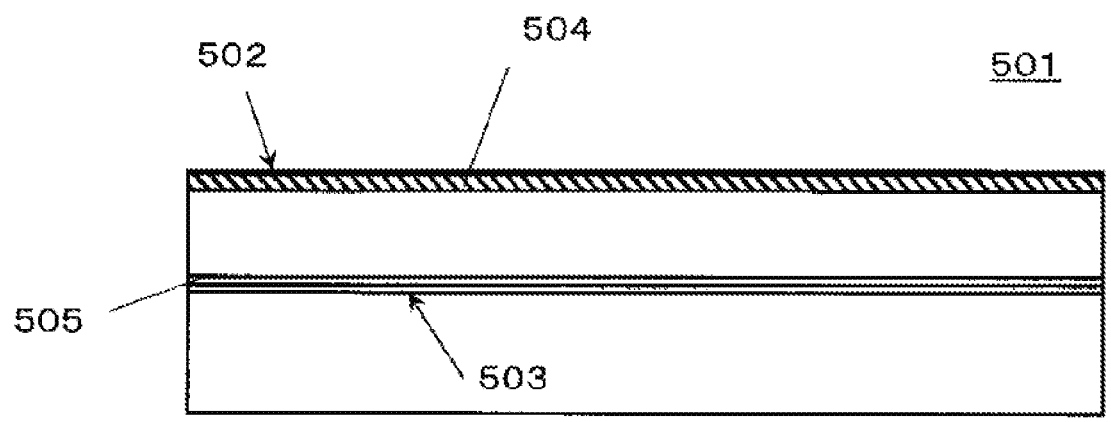
FIG. 5 is a schematic view of a cross section of a shaped product produced by compression-molding a molding material in the present invention, and is an explanatory view for a surface layer region and a central region.

The method of expelling the oxygen gas existing in the heating chamber using a superheated steam is not specifically limited, but preferably a heating device equipped with a mechanism of introducing a saturated water vapor into the heating device under a pressure higher than an atmospheric pressure is used. This embodiment is extremely preferred from the viewpoint of equipment, not requiring a superheated steam generating device (for example, super-heater) to previously prepare a superheated steam. The mechanism of introducing a saturated water vapor under a pressure higher than an atmospheric pressure is a mechanism of such that, as shown by 205 in FIG. 2, a saturated water vapor is prepared outside the heating device, and this is introduced into the heating device. After introduced into the heating device, the vapor may be a superheated steam inside the heating device, and for example, the saturated water vapor may be heated in the vapor flow path that circulates by a circulating device to be mentioned below (209 in FIG. 2) to be thereby a superheated steam, or during the part to reach the flow path (for example, the part shown by the dotted line of 401 in FIG. 4), the vapor may become a superheated steam.

Preferably, the lower limit of the pressure of the saturated water vapor is an atmospheric pressure or more for preventing backward flow. For the purpose of illustration, 205 in FIG. 2 is a saturated water vapor, but when a nitrogen gas is used, 205 in FIG. 2 is a nitrogen gas.

(Oxygen Gas Concentration in Heating Chamber)

The oxygen gas concentration in the heating chamber is not specifically limited, but is preferably 10 vol % or less, more preferably 5 vol % or less, even more preferably 3 vol % or less.

When the oxygen gas concentration in the heating chamber is 10 vol % or less, reduction in the molecular weight of the shaped product after heating can be more effectively suppressed. "Vol %" as referred to herein means the volume ratio in the atmospheric gas.

Figure 3:
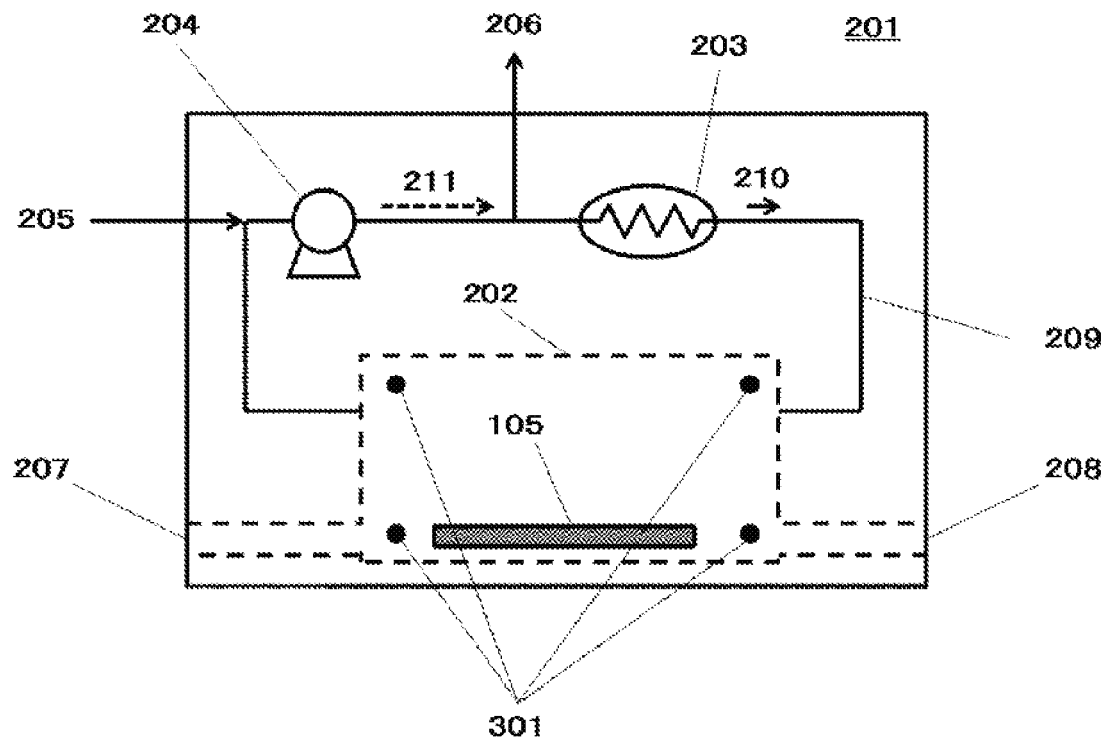
FIG. 3 is a schematic view showing one example of a heating device in which the position for oxygen gas concentration measurement are shown.

Regarding the position for measurement of the oxygen concentration, the oxygen concentration near the molding material in the heating chamber may be measured, and for example, preferably, the concentration is measured at four points shown by 301 in FIG. 3.

Preferably, a nitrogen gas or a superheated steam is kept continuously introduced into the chamber until the entire heating material is completely heated (until continuous production of a heated molding material is finished), and by specifically so controlling that the vapor could flow from the heating chamber toward the outside of the heating device, the oxygen gas concentration may be prevented from increasing even near the opening section.

(Circulation Mechanism)

Preferably, the heating device of the present invention has a circulation mechanism. The circulation mechanism is to circulate the gas inside the heating chamber in a predetermined direction so as to run through a heater to heat the gas inside the heating chamber. In FIG. 2, the gas inside the heating chamber is circulated by the blower (204) and the vapor is heated by the heater (203). The circulating direction is not specifically limited, and may be in any direction. 209 in FIG. 2 shows the flow path of the gas that is circulated by the circulation mechanism. More preferably, from the viewpoint of equipment protection, a part of the circulating vapor is discharged on the way of the flow path (for example, the gas is discharged through the exhaust port of 206 in FIG. 2).

The gas circulation by the circulation mechanism is a forced convection and is not a natural convention by heating. Consequently, it is recommended to install an ordinary circulation device such as a blower (204 in FIG. 2) or the like in the present invention.

(Mechanism of Jetting Nitrogen Gas, Superheated Steam or Saturated Water Vapor)

The method of introducing a nitrogen gas or a superheated steam into the heating chamber is not specifically limited, but preferably the heating device is provided with a mechanism of jetting a gas that contains at least one of a nitrogen gas, a superheated steam or a saturated steam in the same direction as the circulating direction of the gas circulated by the circulation device. In one example of this case, a gas that contains at least one of a nitrogen gas, a superheated steam or a saturated water vapor may be jetted into the flow path of the gas circulated by the circulation device to thereby efficiently lower the oxygen gas concentration. More specifically, a gas that contains at least one of a nitrogen gas, a superheated steam or a saturated water vapor may be jetted in the arrowed direction shown by 210 in FIG. 2. In FIG. 2, a gas that contains at least one of a nitrogen gas, a superheated steam or a saturated water vapor is jetted at 210, but the jetting site is not specifically limited so far as it is in the direction of vapor circulation to be attained by the circulation mechanism.

As a general local ventilation method, there are known a displacement ventilation system and a mixing ventilation system. For enhancing the ventilation efficiency, a system where the ventilation flow direction is in one direction is effective. Also in the present device, preferably, the gas inside the heating chamber could be efficiently purged with a nitrogen gas or a superheated steam, and therefore, the jetting direction of the gas containing at least one of a nitrogen gas, a superheated steam or a saturated water vapor is preferably in the same direction as the flow direction of the gas to be circulated in the chamber.

Regarding the same direction, the two directions do not have to be completely in the same direction, but a nitrogen gas or a superheated steam may be jetted in the direction falling within a range of 30 degrees or less relative to the circulating direction, more preferably in the direction falling within a range of 15 degrees or less.

The temperature of the circulating vapor is preferably higher than the saturated water vapor temperature at an atmospheric pressure.

In the present invention, atmospheric pressure includes a standard atmospheric pressure (1013.25 hPa) and a pressure around it, and also includes a pressure falling within a range of ordinary atmospheric pressure change.

(Heating Temperature of Molding Material)

The temperature of the heated molding material is not specifically limited, but from the viewpoint of improving moldability, a preferred heating temperature of the molding material is a temperature higher than the melting point of a crystalline resin by 10° C. or more when the thermoplastic resin in the heated molding material is the crystalline resin, or a temperature higher than the glass transition temperature of an amorphous resin by 100° C. or more when the thermoplastic resin is the amorphous resin. In the case where the thermoplastic resin is a crystalline resin, a more preferred heating temperature of the molding material is a temperature higher than the melting point by 20° C. or more, even more preferably, the heating temperature of the molding material is a temperature higher than the melting point by 30° C. or more, especially preferably, the heating temperature of the molding material is a temperature higher than the melting point by 50° C. or more, and most preferably, the heating temperature of the molding material is a temperature higher than the melting point by 60° C. or more.

In the above-mentioned PTL 1 (JP-A-2013-49150), the heating temperature is low relative to the melting point of the thermoplastic resin contained in the molding material, and the molding material is not molded by heating in a severe environment.

For more improving the flowability thereof, the molding material must be heated in a further severer environment. In the heating device of the present invention, even when a molding material is heated in such a severe environment, reduction in the molecular weight of the thermoplastic resin existing in the surface area region of the molding material can be effectively suppressed. Accordingly, reduction in the molecular weight in the surface layer area of the shaped product after cold pressing can be suppressed, and therefore a press shaped product excellent in appearance and weather resistance can be obtained.

(Thickness of Molding Material)

The thickness of the molding material before heating is not specifically limited, but is preferably 0.5 mm or more for more noticeably attaining the object of the present invention. When the molding material before heating is thin, the molding material can be heated inside it even though the heating time in a severe environment is short; but when the thickness of the molding material before heating is 0.5 mm or more, long-term heating in a severe environment is needed for heating the inside of the material. When a molding material is heated for a long period of time in a severe environment, the molecular weight in the surface thereof more noticeably lowers, and therefore, according to the technique of the present invention, the molding material can be more effectively heated (without lowering the molecular weight of the surface thereof).

In the above-mentioned PTL 1 (JP-A-2013-49150), the molding material before heating is thin, and therefore does not have to be heated for a long period of time in a severe environment.

In the case where the molding material before heating for use in the present invention has a configuration of laminated multiple layers, the above-mentioned thickness does not indicate the thickness of each layer, but indicates the total thickness of all the constituent layers combined (before heating). The embodiment of the molding material having the above-mentioned laminate configuration before heating may be an embodiment of laminated plural layers all having the same composition, or an embodiment of laminated plural layers each having a different composition.

(Molding Material)

The molding material in the present invention is used for compression molding, and before subjected to compression molding, the molding material is generally heated.

(Surface Molecular Weight of Resultant Shaped Product)

The molding material heated in the heating device of the present invention contains carbon fibers and a thermoplastic resin and is compression-molded into a shaped product. Preferably, the number-average molecular weight $Mn1$ and the weight-average molecular weight $Mw1$ of the thermoplastic resin existing in at least one surface layer region of the resultant shaped product, and the number-average molecular weight $Mn2$ and the weight-average molecular weight $Mw2$ of the thermoplastic resin existing in the central region of the shaped product satisfy the following relation:

$$1.0<(Mw1/Mn1)/(Mw2/Mn2)<2.6 \quad \text{Formula (4)}$$

The surface layer region is a region within less than 50 μm from the surface of the shaped product in the thickness direction, and the central region is the other region than the surface layer region of the shaped product. For example, the sample of the central region may be collected from the region that ranges from the center cross section of the shaped product to less than 50 μm toward the surface thereof.

When a heated molding material is compared with shaped product obtained by cold-pressing the heated molding material, there is no theoretical difference in the molecular weight between the two, and therefore in the molding material containing carbon fibers and a thermoplastic resin, which has been heated in the heating device of the present invention, the number-average molecular weight $Mn1'$ and the weight-average molecular weight $Mw1'$ of the thermoplastic resin existing in the surface layer region of the heated molding material, and the number-average molecular weight $Mn2'$ and the weight-average molecular weight $Mw2'$ of the thermoplastic resin existing in the central region of the heated molding material may satisfy the following relation:

$$1.0<(Mw1'/Mn1')/(Mw2'/Mn2')<2.6 \quad \text{Formula (5)}$$

Even when the molding material in the present invention is heated under a severe condition, reduction in the molecular weight of the thermoplastic resin in the surface layer region of the molding material can be suppressed. Accordingly, reduction in the molecular weight of the surface layer region of the shaped product after cold pressing can be suppressed, and a shaped product excellent in appearance and weather resistance can be obtained.

The value of (Mw1/Mn1)/(Mw2/Mn2) is more preferably more than 1.0 and 2.5 or less, even more preferably more than 1.0 and 2.1 or less, and further more preferably more than 1.0 and 1.8 or less.

The writers presume that the appearance evaluation has a relatively high relationship to the number-average molecular weight Mn of the thermoplastic resin existing in the surface layer region.

[Carbon Fibers]

The molding material for use in the present invention is not specifically limited, but preferably contains carbon fibers and a thermoplastic resin.

As one preferred embodiment, an example of the molding material containing carbon fibers is described below.

The kind of the carbon fibers may be appropriately selected depending on the kind of the thermoplastic resin and the use of the molding material, and is therefore not specifically limited.

Above all, from the viewpoint of excellent tensile strength, use of polyacrylonitrile (PAN)—based carbon fibers is preferred. In the case where PAN-based carbon fibers are used, the tensile modulus thereof is preferably within a range of 100 to 600 GPa, more preferably within a range of 200 to 500 GPa, even more preferably within a range of 230 to 450 GPa. The tensile strength thereof is preferably within a range of 2000 to 6000 MPa, more preferably within a range of 3000 to 6000 MPa.

(Fiber Length of Carbon Fibers)

The fiber length of the carbon fibers may be appropriately determined depending on the kind of the carbon fibers, the kind of the thermoplastic resin, and the orientation state of the carbon fibers in the molding material, and is therefore not specifically limited. Accordingly, depending on the intended purpose, continuous fibers may be used or discontinuous fibers may be used.

In the case where discontinuous fibers are used, the average fiber length thereof is, in general, preferably within a range of 0.1 mm to 500 mm, more preferably within a range of 1 mm to 100 mm.

A molding material that contains carbon fibers having an average fiber length of 1 mm or more exhibits extremely excellent flowability in compression molding thereof, when heated in a severe environment.

Carbon fibers having a different fiber length may be used as combined. In other words, the average fiber length of the carbon fibers for use herein may have a single peak, or may have plural peaks.

Regarding the average fiber length of carbon fibers, in the case where carbon fibers are cut to have a certain length using a rotary cutter or the like, the cut length corresponds to the average fiber length, and this is also a number-average fiber length and a weight-average fiber length. When the fiber length of individual carbon fibers is represented by Li, the number of the fibers to be analyzed is by j, the number-average fiber length (Ln) and the weight-average fiber length (Lw) may be determined according to the following formulae (2) and (3) (in the case of a certain cut length, the weight-average fiber length (Lw) may be calculated according to the calculating formula (2) for the number-average fiber length (Ln)).

$$Ln = \Sigma Li/j \qquad \text{Formula (2)}$$

$$Lw = (\Sigma Li^2)/(\Sigma Li) \qquad \text{Formula (3)}$$

The average fiber length to be measured may be a number-average fiber length or a weight-average fiber length.

(Fiber Morphology of Carbon Fibers)

Irrespective of the kind thereof, the carbon fibers may be a single fiber type formed of a single fiber, or may be a fiber bundle type formed of plural single fibers.

The carbon fibers may be all single fiber type or may be all fiber bundle type, or may be in the form of a mixture of the two types. The fiber bundle as referred to herein indicates that 2 or more single fibers are kept close to each other by a sizing agent or an electrostatic force, or the like. In the case where bundled fibers are used, the number of the single fibers constituting each fiber bundle may be almost uniform in the fiber bundles, or may differ. In the case where the carbon fibers are in a fiber bundle type, the number of the single fibers constituting each fiber bundle is not specifically limited but is, in general, within a range of 20,000 to 100,000.

In general, carbon fibers are in the form of fiber bundles of several thousands to tens of thousands of aggregating filaments. When the carbon fibers are uses as such, the entangled portions of the fiber bundles are locally thick and, a thin molding material would be difficult to obtain. Consequently, in general, the fiber bundles are widened or opened before use.

Regarding the orientation state of the carbon fibers in the molding material, for example, there may be mentioned a unidirectional orientation where the major axis direction of the carbon fibers is aligned in one direction, and a two-dimensional random orientation where the major axis direction is randomly aligned in the in-plane direction of the molding material.

The orientation state of the carbon fibers may be any of the unidirectional orientation or the two-dimensional random orientation. The state may also be a disordered orientation that is an intermediate between the above-mentioned unidirectional orientation and the two-dimensional random orientation (an orientation state where the major axis direction of the reinforcing fibers is not completely aligned in one direction and is not completely at random). Further, depending on the fiber length of the carbon fibers, the orientation may be such that the major axis direction of the carbon fibers has an angle relative to the in-plane direction of the molding material, or may be such that the fibers are aligned in a cotton-like entangling orientation, or may be such that the fibers are aligned like two-dimensional knitted fabrics such as plain woven fabrics or twill woven fabrics, or multi-axial woven fabrics, nonwoven fabrics, mats, knits, braided cords, or papers formed by papermaking with carbon fibers, etc.

The orientation state may be confirmed by, for example, performing a tensile test measuring tensile moduli in an arbitrary direction of the molding material and in the direction perpendicular to the arbitrary direction, measuring a ratio (Eδ) calculated by dividing the larger tensile modulus by a smaller tensile modulus among two tensile moduli measured in the tensile test. When the ratio of the elastic moduli is nearer to 1, it may be evaluated that the carbon fibers are in a two-dimensional random orientation. When the ratio calculated by dividing the large one of the elastic modulus values in two directions perpendicular to each other by the small one is not more than 2, the orientation state is considered to be isotropic, and when the ratio is not more than 1.3, the orientation state is evaluated to be excellent in isotropy.

(Volume Fraction (Vf) of Carbon Fibers)

In a preferred embodiment of a case where the molding material contains carbon fibers and a thermoplastic resin, the volume fraction (Vf) of the carbon fibers contained in the molding material, as defined by the formula (1), is, though not specifically limited, preferably 5 to 80%, more preferably 10 to 80%, even more preferably 10 to 70%, still more preferably 20 to 50%, and most preferably 30 to 40%.

$$100\times(\text{Volume of carbon fibers})/((\text{Volume of carbon fibers})+(\text{Volume of thermoplastic resin})) \quad \text{Formula (1)}$$

When the volume fraction (Vf) of the carbon fibers is 5% or more, the reinforcing effect can be expressed sufficiently with ease.

On the other hand, when Vf is 80% or less, voids would hardly form in the resultant molding material and the physical properties of the molding material can improve readily.

[Thermoplastic Resin]

A preferred embodiment of the molding material containing a thermoplastic resin is described below.

The thermoplastic resin is not specifically limited so far as it can give a molding material having a desired strength, and may be appropriately selected in accordance with the intended use of the molding material.

The thermoplastic resin is not specifically limited. The thermoplastic resin may be arbitrarily selected from any kind of thermoplastic resins having a desired softening point or a melting point depending on the intended use of the molding material. In general, a thermoplastic resin having a softening point within a range of 180° C. to 350° C. may be used, but is not limited thereto.

The thermoplastic resin includes a polyolefin resin, a polystyrene resin, a thermoplastic polyamide resin, a polyester resin, a polyacetal resin (polyoxymethylene resin), a polycarbonate resin, a (meth)acrylic resin, a polyarylate resin, a polyphenylene ether resin, a polyimide resin, a polyether nitrile resin, a phenoxy resin, a polyphenylene sulfide resin, a polysulfone resin, a polyketone resin, a polyether ketone resin, a thermoplastic urethane resin, a fluororesin, a thermoplastic polybenzimidazole resin, a vinyl-based resin, etc.

The polyolefin resin includes, for example, a polyethylene resin, a polypropylene resin, a polybutadiene resin, a polymethylpentene resin, etc.

The vinyl based resin includes a vinyl chloride resin, a vinylidene chloride resin, a vinyl acetate resin, a polyvinyl alcohol resin, etc.

The polystyrene resin includes, for example, a polystyrene resin, an acrylonitrile-styrene resin (AS resin), an acrylonitrile-butadiene-styrene resin (ABS resin), etc.

The polyamide resin includes, for example, a polyamide 6 resin (nylon 6), a polyamide 11 resin (nylon 11), a polyamide 12 resin (nylon 12), a polyamide 46 resin (nylon 46), a polyamide 66 resin (nylon 66), a polyamide 610 resin (nylon 610), etc.

The polyester resin includes, for example, a polyethylene terephthalate resin, a polyethylene naphthalate resin, a polybutylene terephthalate resin, a polytrimethylene terephthalate resin, a liquid-crystal polyester, etc. The (meth)acrylic resin includes, for example, a polymethyl methacrylate.

The polyphenylene ether resin includes, for example, a modified polyphenylene ether, etc. The thermoplastic polyimide resin includes, for example, a thermoplastic polyimide, a polyamideimide resin, a polyether imide resin, etc. The polysulfone resin includes, for example, a modified polysulfone resin, a polyether sulfone resin, etc.

The polyether ketone resin includes, for example, a polyether ketone resin, a polyether ether ketone resin, a polyether ketone ketone resin. The fluororesin includes, for example, a polytetrafluoroethylene, etc.

One alone or two or more kinds of thermoplastic resins may be used in the present invention either singly or as combined. An embodiment of using two or more kinds of thermoplastic resins includes, for example, though not limited thereto, an embodiment of using thermoplastic resins differing from each other in point of the softening point or the melting point, an embodiment of using thermoplastic resins differing from each other in point of the average molecular weight, etc.

(Other Ingredients)

Within a range not detracting from the object of the present invention, the molding material for use in the present invention may contain additives such as various fibrous or non-fibrous fillers of organic fibers or inorganic fibers, a flame retardant, an anti-UV agent, a stabilizer, a mold release agent, a pigment, a softener, a plasticizer, a surfactant, etc.

(Method for Producing Molding Material)

The molding material for use in the present invention may be produced according to an ordinary known method, and for example, an isotropic substrate described in WO2012/105080 or JP-A-2013-49298 is preferably used. In the molding material using such an isotropic substrate, the carbon fibers are not aligned in a specific direction in the plane of the substrate, but are aligned as dispersed in a random direction.

(Compression Molding: Cold Pressing)

The molding material heated in the present invention is compression-molded into a shaped product. A preferred molding method for producing the shaped product is compression molding by cold pressing.

In cold pressing, a heated molding material is put in a mold cavity set at a predetermined temperature, then arranged in a mold controlled to be at a temperature of the softening temperature of the molding material or less, and pressurized and cooled.

When put into a mold cavity, one alone (one sheet) or plural sheets of the heated molding material are used in accordance with the thickness of the intended shaped product. In the case where plural sheets are used, the plural sheets may be previously laminated and heated, or heated molding materials may be layered and then put into a molding cavity, or heated molding materials may be laminated sequentially in a molding cavity.

(Problem in Cold Pressing)

In the case where a press shaped product is produced in cold pressing, the method always includes a step of previously heating a molding material in a heating chamber. When a molding material is heated, the oxygen gas existing in air reacts with the thermoplastic resin contained in the molding material, therefore inevitably causes molecular weight reduction.

In a conventional heating device, molecular weight reduction to be caused by heating in cold pressing could not be suppressed.

(Compression Molding: Hot Pressing)

Next, hot pressing is described. Hot pressing includes at least the following step A-1) to step A-3):

Step A-1): A step of arranging the molding material in a mold.

Step A-2): A step of heating the mold up to the softening temperature of the thermoplastic resin or more, and applying a pressure thereto.

Step A-3): A step of molding the material while controlling the temperature of the molding to be lower than the softening point of the thermoplastic resin.

In the case where a shaped product is produced by hot pressing, the molding material may be, not previously heated, arranged in a mold at room temperature (Step A-1), and then heated up to a temperature of the softening temperature of the thermoplastic resin or higher, and thereafter given a pressure (step A-2); however, even in hot pressing, when the molding material is previously heated, the material is exposed to a high temperature and an oxygen atmosphere in the heating step, like in cold pressing, and there occurs the problem like in the present invention.

(Thickness of Shaped Product)

The thickness of the shaped product obtained by molding the molding material that has been heated according to the production method or heated in the heating device of the present invention is not specifically limited and is, in general, preferably within a range of 0.01 mm to 100 mm, more preferably within a range of 0.01 mm to 10.0 mm, even more preferably within a range of 0.1 to 5.0 mm.

In the case where the shaped product has a configuration of laminated plural layers, the thickness is not intended to indicate the thickness of each layer but indicates the total thickness of the entire shaped product of all the constituent layers.

The shaped product may have a single-layer configuration formed of a single layer, or may have a laminated configuration of laminated plural layers.

The embodiment of the laminated configuration of the shaped product includes an embodiment of laminated plural layers all having the same composition, or an embodiment of laminated plural layers each having a different composition.

The lower limit of the thickness of the shaped product is more preferably 0.1 mm or more, even more preferably 0.3 mm or more, especially preferably 0.5 mm or mores, and most preferably 1.0 mm or more.

EXAMPLES

Examples are shown below, but the present invention is not restricted to these. The values in the following Examples were determined according to the methods mentioned below.

(1) Analysis of Volume Fraction of Carbon Fibers (Vf)

The molding material was heated in a furnace at 500° C. for 1 hour to burn and remove the thermoplastic resin, and the mass of the sample before and after the treatment was measured to calculate the mass of the fraction of carbon fibers and the thermoplastic resin. Next, using the specific gravity of each component, the volume proportion of the carbon fibers and the thermoplastic resin was calculated.

$$Vf = 100 \times (\text{Volume of carbon fibers}) / ((\text{Volume of carbon fibers}) + (\text{Volume of thermoplastic resin}))$$ Formula (1)

(2) Analysis of Weight-Average Fiber Length of Carbon Fibers Contained in Molding Material The weight-average fiber length of the carbon fibers contained in the molding material was determined as follows. The molding material was heated in a furnace at 500° C. for about 1 hour to remove the thermoplastic resin, and the length of 100 carbon fibers randomly extracted from the sample was measured and recorded to a unit of 1 mm using a caliper and a magnifying glass. From the length of all the measured carbon fibers (Li, here i=integer of 1 to 100), the weight-average fiber length (Lw) was determined according to the following formula.

$$Lw = (\Sigma Li^2)/(\Sigma Li)$$ Formula (3)

(3) Evaluation of Appearance of Shaped Product

Samples of the shaped product were tested for organoleptic evaluation in 4 ranks. After weathering test, the appearance of the samples was visually evaluated based on the appearance thereof before weathering test as a standard appearance. From the viewpoint of fading, exposure of reinforcing fibers and others, the tested samples were evaluated.

In the weathering test, Super Xenon Weather Meter SX75 by Suga Test Instruments Co., Ltd. was used as a tester. The test method followed SAE J 2527 (2004.02), and the test was continued until the irradiation energy could reach 2500 kJ/m².

5: There was little difference from the standard appearance.

4: A difference from the standard appearance was recognized, but the resin impregnated in the fiber bundles and the single fibers.

3: A difference from the standard appearance was recognized, and the resin was damaged in a part of the short fibers and therefore the appearance worsened in some degree. This is on a practically acceptable level.

2: A difference from the standard appearance was recognized, and the resin was damaged in a part of the short fibers and the appearance worsened greatly. However, depending on use, this is on a practically acceptable level.

1: An obvious difference from the standard appearance was recognized, and the resin having impregnated in the reinforcing fibers was damaged, and fiber bundles and single fibers with no resin impregnation were exposed. This is a practically unacceptable level.

(4) Measurement of Number-Average Molecular Weight (Mn) and Weight-Average Molecular Weight (Mw)

After cold pressing, the surface layer region of the shaped product (or the central region of the shaped product: the sample of the central region was collected from the region that ranges from the center cross section of the shaped product to less than 50 µm toward the surface thereof) was cut out to give test samples using a flat-blade knife. Regarding the sampling weight, a whole region of a test piece of 135 mm×65 mm was cut with a flat-blade knife to give samples for measurement of about 80 to 120 mg each.

The molecular weight was determined through gel permeation chromatography (GPC). As an apparatus, HLC-8220GPC manufactured by Tosoh Corporation was used; as a detector, a differential refractometer (RI) was used; and as a solvent, $CF_3COONa$ was added to hexafluoroisopropanol (HFIP) to be 10 mM (mol/l). As columns, one column of HFIP-LG and two columns of HFIP-806M, manufactured by Showa Denko K.K., were used. The solvent flow rate was 0.8 ml/min, the sample concentration was about 0.1 wt/vol %, and from the samples for measurement, the insolubles were removed by filtration through a filter. Based on the resultant elution curve, the polymethyl methacrylate (PMMA)-equivalent number-average molecular weight (Mn) and weight-average molecular weight (Mw) of each sample were calculated.

Production Example 1 for Molding Material

1. Preparation of Resin Composition

A nylon 6 resin A1030 manufactured by Unitika Ltd. was used as a matrix resin, copper iodide (manufactured by Nihon Kagaku Sangyo Co., Ltd., trade name, cuprous iodide) and potassium iodide (manufactured by Ise Chemicals Corporation) were added thereto, and further as a black pigment, carbon black BP800 manufactured by Cabot Corporation was added. These were kneaded with a twin-screw extruder to give a carbon black master batch.

The resultant carbon black master batch was added to a nylon 6 resin A1030 manufactured by Unitika Ltd. to be a 50-fold dilution (carbon master batch, 2%), kneaded and extruded through a twin-crew extruder to give a resin composition. The amounts in part by mass of the copper iodide, the potassium iodide and the black pigment (carbon black) contained in the resin composition were, based on 100 parts by mass of the polyamide 6 therein, 0.15 parts by mass, 0.074 parts by mass and 0.60 parts by mass, respectively.

2. Production of Molding Material

As reinforcing fibers, carbon fibers "Tenax" (registered trademark) STS40-24KS (average fiber diameter 7 μm) manufactured by Toho Tenax Co., Ltd., which had been processed with a nylon-type sizing agent were used; as a thermoplastic resin, the resin composition obtained in the above was used; and according to the method described in WO2012/105080, an isotropic material was produced, preheated at 240° C. for 90 seconds, and hot-pressed at 240° C. for 180 seconds under a pressure of 2.0 MPa kept applied thereto. Next, under the pressurized state, this was cooled to 50° C. to give a flat plate having a thickness of 2 mm, having a volume proportion of carbon fibers Vf=35%, and a weight-average fiber length of carbon fibers of 20 mm, and this was referred to as a molding material 1.

Example 1

For a heating device, a circulating air oven manufactured by HK Prazisionstechnik GmbH was prepared. Two opening sections for a supply part and a discharge part were arranged, and the size thereof was 111 mm×1900 mm each. The size of the heating chamber was 11 m$^3$.

A passage for introducing a saturated water vapor (205 in FIG. 2) was formed through the heating apparatus, and the passage was connected to the passage (209 in FIG. 2) for gas circulated by a circulation device. 11 jetting ports were arranged for jetting the introduced saturated water vapor (this may be often a superheated steam as heated) from the site of 210 in FIG. 2.

With that, the heating chamber was previously heated at 295° C., and a saturated water vapor was introduced from 205 in FIG. 2 at 115 m$^3$/hr, and, while heated, jetted out through the jetting ports (in the arrow direction of 210 in FIG. 2). Accordingly, the saturated water vapor (this may be often a superheated steam as heated) could be jetted in the same direction as the circulating direction. The introduced saturated water vapor was a superheated steam at least in the heating chamber. Subsequently, the apparatus was kept stood by for 30 minutes.

After thus stood by, the molding material 1 was introduced into the heating chamber, and heated for 420 seconds to produce a heated molding material. The heated molding material was put in the mold set at 140° C., and cold-pressed to give a shaped product.

During the time period, for continuously heating the molding material one after another, the molding material was supplied and taken out from the heating chamber every 42 seconds. Each of the opening times of the opening section was 3 to 5 seconds, and the oxygen gas concentrations were measured at 4 sites of 301 in FIG. 3. The concentrations were averaged. The saturated water vapor introduction was carried out at 115 m$^3$/hr, and was continuously carried out until the molding material was molded completely.

The evaluation results of the resultant shaped product are shown in Table 1. The value of the oxygen gas concentration varied in the range, and this is because an openable and closable opening section was used and therefore the measured values fluctuated. The thickness of the resultant shaped product was 2 mm.

Example 2

The molding material was heated and cold-pressed to produce a shaped product, in the same manner as in Example 1 except that the heating time was 600 seconds. The results are shown in Table 1.

Example 3

The molding material was heated and cold-pressed to produce a shaped product, in the same manner as in Example 1 except that the heating time was 800 seconds. The results are shown in Table 1.

Example 4

The molding material was heated and cold-pressed to produce a shaped product, in the same manner as in Example 1 except that the superheated steam was introduced in the jetting direction vertical to the circulating direction of the gas circulated by the circulation device (in the direction vertical to the paper face in FIG. 2, that is, in the direction from the front side toward the back side), that the oxygen gas concentration was 6 to 8 vol %, that the preset temperature of the heating chamber was 275° C. and that the heating time was 850 seconds. The results are shown in Table 1.

Example 5

The molding material was heated and cold-pressed to produce a shaped product, in the same manner as in Example 3 except that a superheated steam was not used but a nitrogen gas was used and that the preset temperature of the heating chamber was 300° C. The results are shown in Table 1.

Comparative Example 1

The molding material was heated and cold-pressed to produce a shaped product, in the same manner as in Example 1 except that a superheated steam was not used and the molding material was heated in air, and that the heating time was 800 seconds. The results are shown in Table 1.

TABLE 1

|  | Example 1 | Example 2 | Example 3 | Example 4 | Example 5 | Comparative Example 1 |
|---|---|---|---|---|---|---|
| Molding Material | | | | | | |
| Reinforcing Fibers | Carbon fibers | Carbon fibers | Carbon fibers | Carbon fibers | Carbon fibers | Carbon fibers |
| Resin | Nylon 6 | Nylon 6 | Nylon 6 | Nylon 6 | Nylon 6 | Nylon 6 |
| Heating Device | | | | | | |
| Heating Chamber | | | | | | |
| Oxygen Gas Concentration (vol %) | 1.6 to 2.1 | 1.6 to 2.1 | 1.6 to 2.1 | 6 to 8 | 4 to 5 | 21.2 |
| Kind of Infill Gas | Superheated steam | Superheated steam | Superheated steam | Superheated steam | Nitrogen gas | — |
| Preset Temperature of Heating Chamber | 295° C. | 295° C. | 295° C. | 275° C. | 300° C. | 295° C. |
| Jetting Direction | Same as the circulating direction | Same as the circulating direction | Same as the circulating direction | Vertical to circulating direction | Same as the circulating direction | — |
| Opening Time per one opening of openable and closable opening section | 3 to 5 seconds | 3 to 5 seconds | 3 to 5 seconds | 3 to 5 seconds | 3 to 5 seconds | — |
| Heating Time (sec) | 420 | 600 | 800 | 850 | 800 | 800 |
| Evaluation | | | | | | |
| (Mw1/Mn1)/(Mw2/Mn2) | 1.78 | 2.08 | 2.54 | 3.44 | 2.56 | 2.75 |
| Number-average molecular weight Mn1 of thermoplastic resin existing in surface layer region | 10,100 | 9,500 | 8,700 | 7,000 | 4,800 | 3,400 |
| Weight-average molecular weight Mw1 of thermoplastic resin existing in surface layer region | 48,480 | 53,100 | 60,030 | 65,050 | 32,640 | 30,940 |
| Number-average molecular weight Mn2 of thermoplastic resin existing in central region | 17,400 | 17,500 | 17,200 | 17,350 | 17,200 | 17,700 |
| Weight-average molecular weight Mw2 of thermoplastic resin existing in central region | 46,980 | 47,100 | 46,700 | 46,850 | 45,700 | 58,620 |
| Evaluation of Appearance after weathering test | 5 | 4 | 3 | 2 | 2 | 1 |

INDUSTRIAL APPLICABILITY

The heated molding material in the present invention may be compression-molded into a shaped product. The shaped product can be used for various constructional members, for example, inner plates, outer plates and structural members for automobiles, or for housings for various electrical appliances, machine frames, etc. Preferably, the shaped product is used as automobile parts.

While the present invention has been described in detail and with reference to specific embodiments thereof, it will be apparent to one skilled in the art that various changes and modifications can be made therein without departing from the spirit and scope thereof.

The present application is based upon a Japanese patent application (No. 2015-254638) filed Dec. 25, 2015, the contents of which are incorporated herein by reference.

REFERENCE SIGNS LIST

101 HEATING DEVICE
102 HEATING CHAMBER (INSIDE THE DOTTED LINE)
103 NITROGEN GAS OR SUPERHEATED STEAM
104 OPENING SECTION
105 MOLDING MATERIAL
201 HEATING DEVICE
202 HEATING CHAMBER (INSIDE THE DOTTED LINE)
203 HEATER
204 BLOWER
205 SATURATED WATER VAPOR
206 DISCHARGE PORT
207 SUPPLY PORT
208 DISCHARGE PORT
209 PATH OF VAPOR CIRCULATING BY CIRCULATING DEVICE
210 VAPOR CONTAINING AT LEAST ONE OF NITROGEN GAS, SUPERHEATED STEAM OR SATURATED WATER VAPOR
211 CIRCULATING DIRECTION
301 POINT FOR MEASUREMENT OF OXYGEN GAS CONCENTRATION
401 REGION WHERE SATURATED WATER VAPOR MAY BE SUPERHEATED STEAM IN THE WAY TO REACH THE PATH OF VAPOR CIRCULATING BY CIRCULATION DEVICE
501 SHAPED PRODUCT
502 SURFACE OF SHAPED PRODUCT
503 CENTRAL CROSS SECTION OF SHAPED PRODUCT
504 SURFACE LAYER REGION
505 EXAMPLE OF CENTRAL REGION

The invention claimed is:

1. A method for producing a shaped product, the method comprising:
    heating a molding material in a heating chamber of a heating device; and
    arranging a heated molding material in a mold controlled to be at a softening temperature or less; and
    compression molding the molding material in the mold, wherein the heating device comprises:
the heating chamber for heating a molding material; and
at least one opening section for supplying or discharging a molding material therethrough, wherein the opening section is openable and closable and the opening time is 1 second or more and 10 seconds or less per one opening thereof; and
wherein the method further comprises expelling an oxygen gas existing in the heating chamber using a nitrogen gas or a superheated steam.

2. The method for producing the shaped product according to claim 1, wherein the heated molding material is a molding material for compression molding that contains carbon fibers having a fiber length of 1 to 100 mm and a thermoplastic resin.

3. The method for producing the shaped product according to claim 1, further comprising:
circulating and heating a gas in the heating chamber; and
jetting a gas containing at least one of a nitrogen gas, a superheated steam or a saturated water vapor in the same direction as a circulating direction of the gas in the heating chamber.

4. The method for producing the shaped product according to claim 1, further comprising: expelling the oxygen gas existing in the heating chamber using a superheated steam; and introducing a saturated water vapor into the heating device under a pressure higher than the atmospheric pressure.

5. The method for producing the shaped product according to claim 1, wherein the oxygen gas concentration in the heating chamber is 10 vol% or less.

6. The method for producing the shaped product according to claim 1, wherein:
the molding material contains carbon fibers and a thermoplastic resin, and is compression-molded into a shaped product after heated, and wherein:
the relationship between the number-average molecular weight $Mn1$ and the weight-average molecular weight $Mw1$ of the thermoplastic resin existing in the surface layer region of the resultant shaped product, and
the number-average molecular weight $Mn2$ and the weight-average molecular weight $Mw2$ of the thermoplastic resin existing in the central region of the shaped product satisfy the following relation:

$$1.0<(Mw1/Mn1)/(Mw2/Mn2)<2.6,$$

wherein the surface layer region is a region within less than 50 μm from the surface of the shaped product, and the central region is a region other than the surface layer region of the shaped product.

7. The method for producing the shaped product according to claim 1, wherein:
the temperature of the heated molding material is a temperature higher than the melting point of a crystalline resin by 30° C. or more when the thermoplastic resin in the heated molding material is the crystalline resin, or a temperature higher than the glass transition temperature of an amorphous resin by 100° C. or more when the resin is the amorphous resin.

8. The method for producing the shaped product according to claim 1, wherein the thickness of the molding material before heating is 0.5 mm or more.

* * * * *